United States Patent [19]

Meyer et al.

[11] Patent Number: 5,741,025
[45] Date of Patent: Apr. 21, 1998

[54] INTEGRAL STEERING WHEEL AND AIR BAG ASSEMBLY

[75] Inventors: Leo Meyer, Tecumseh; Saverio Paonessa, Windsor, both of Canada

[73] Assignee: KS Centoco Ltd., Windsor, Canada

[21] Appl. No.: 650,247

[22] Filed: May 22, 1996

[51] Int. Cl.[6] ................................. B60R 21/16
[52] U.S. Cl. ........................... 280/731; 280/728.2
[58] Field of Search ................. 280/731, 728.2, 280/728.1, 743.1; 74/552

[56] References Cited

U.S. PATENT DOCUMENTS

| | | | |
|---|---|---|---|
| 3,596,532 | 8/1971 | Wilfert | 74/552 |
| 5,188,000 | 2/1993 | Kaga | 74/552 |
| 5,409,256 | 4/1995 | Gordon et al. | 280/728.2 |
| 5,470,099 | 11/1995 | Williams | 280/728.2 |
| 5,492,358 | 2/1996 | Xolin et al. | 280/728.1 |
| 5,560,264 | 10/1996 | Xolin et al. | 280/731 X |
| 5,584,501 | 12/1996 | Walters | 280/728.2 |
| 5,584,503 | 12/1996 | Lutz | 280/731 |

*Primary Examiner*—Christopher P. Ellis
*Attorney, Agent, or Firm*—Dykema Gossett PLLC

[57] ABSTRACT

A steering wheel assembly includes a rigid skeleton with a central hub, a rim encircling the hub and a plurality of spokes disposed therebetween. An air bag module is mounted to the skeleton. A continuous plastic coating is disposed over the skeleton and the air bag module presenting a continuous surface to a vehicle operator when the steering wheel is mounted in a vehicle.

7 Claims, 4 Drawing Sheets

5,741,025

1
INTEGRAL STEERING WHEEL AND AIR BAG ASSEMBLY

FIELD OF THE INVENTION

This invention relates to the field of steering wheels, and more particularly to steering wheel and air bag assemblies and methods for manufacturing steering wheel and air bag assemblies.

BACKGROUND OF THE INVENTION

Motor vehicle driver's side supplemental inflatable restraints, or air bags, are typically mounted to the motor vehicle steering wheel. When the air bag is deployed in a frontal impact, the air bag helps cushion the resultant forward motion of the driver toward the steering wheel. Typically, the air bag is mounted in its undeployed state to a skeleton of a steering wheel. The air bag has a plastic cover which is color keyed to match the color of the plastic steering wheel cover. A plurality of fasteners projecting from one of the steering wheel skeleton and the air bag module are used to fix the two together.

In order to maintain a perception of overall vehicle quality, the color, surface grains, and gloss levels of both the air bag cover and the steering wheel covering must not vary perceptibly from that of the rest of the steering wheel, and the position of the air bag module must be precisely controlled to present a centered position on the steering wheel, with even or consistent gaps and/or flushness between the coverings.

One method of desensitizing the assembly to the relative position of the air bag relative to the steering wheel has been to have the air bag cover overlap the pocket or opening in the steering wheel receiving the air bag module. However, one is still presented with the difficulty of matching the colors, grains, and gloss levels.

It is desired to provide a combined steering wheel and air bag assembly which is both insensitive to minor position variations in the air bag module relative to the steering wheel, and does not vary in color, grain and gloss levels between the steering wheel and the air bag cover covering.

SUMMARY OF THE INVENTION

A steering wheel assembly includes a rigid skeleton with a central hub, a rim encircling the hub and a plurality of spokes disposed therebetween. An air bag module is mounted to the skeleton. A continuous plastic coating is disposed over the skeleton and the air bag module, presenting a continuous surface to a vehicle operator when the steering wheel is mounted in a vehicle.

A method of forming an integral steering wheel and air bag assembly includes the step of forming a rigid skeleton having a central hub, a rim encircling the hub, and a plurality of spokes disposed therebetween. The method also includes the step of positioning the air bag module within the hub to a predetermined location therein. A first plastic is injected around the air bag module, retaining the air bag module in a desired fixed position relative to the skeleton.

The disclosed integral steering wheel and air bag assembly is insensitive to minor relative variations in air bag to steering wheel positioning and eliminates the need for color, grain and gloss level matching between the air bag and the steering wheel, as well as gaps or flushness.

2

Figure 2:
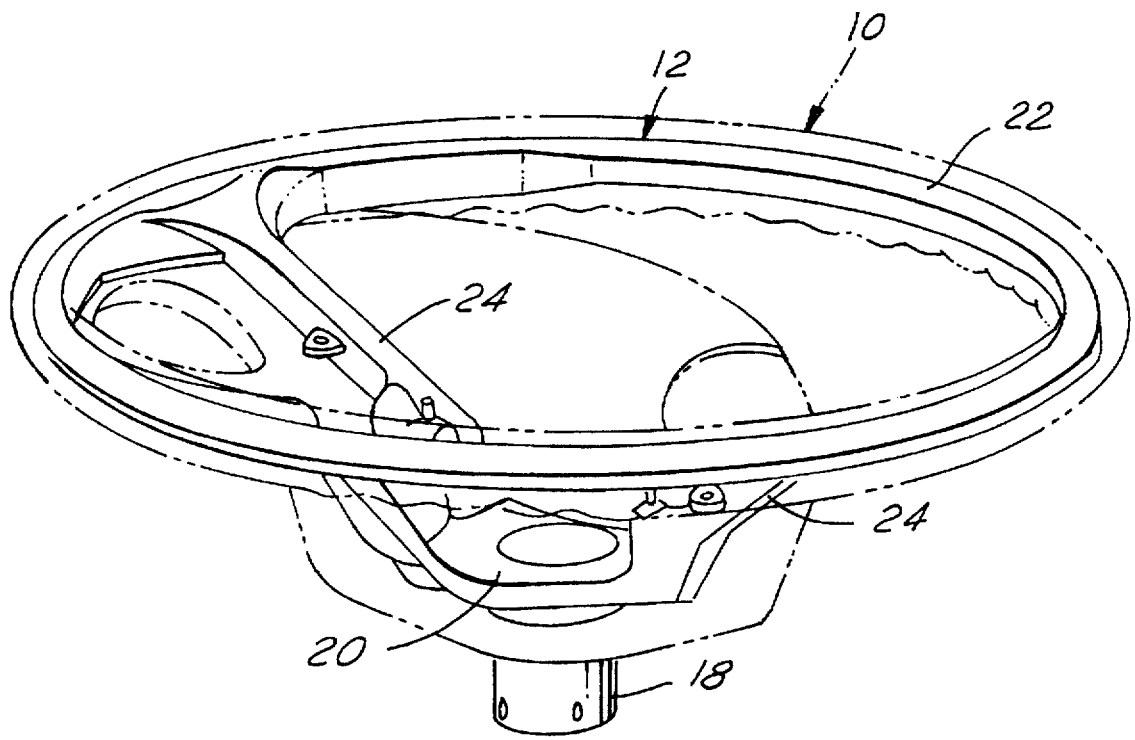

FIG. 2 is a perspective view of a steering wheel skeleton with the configuration of a complete steering wheel assembly shown in phantom.

Figure 3:
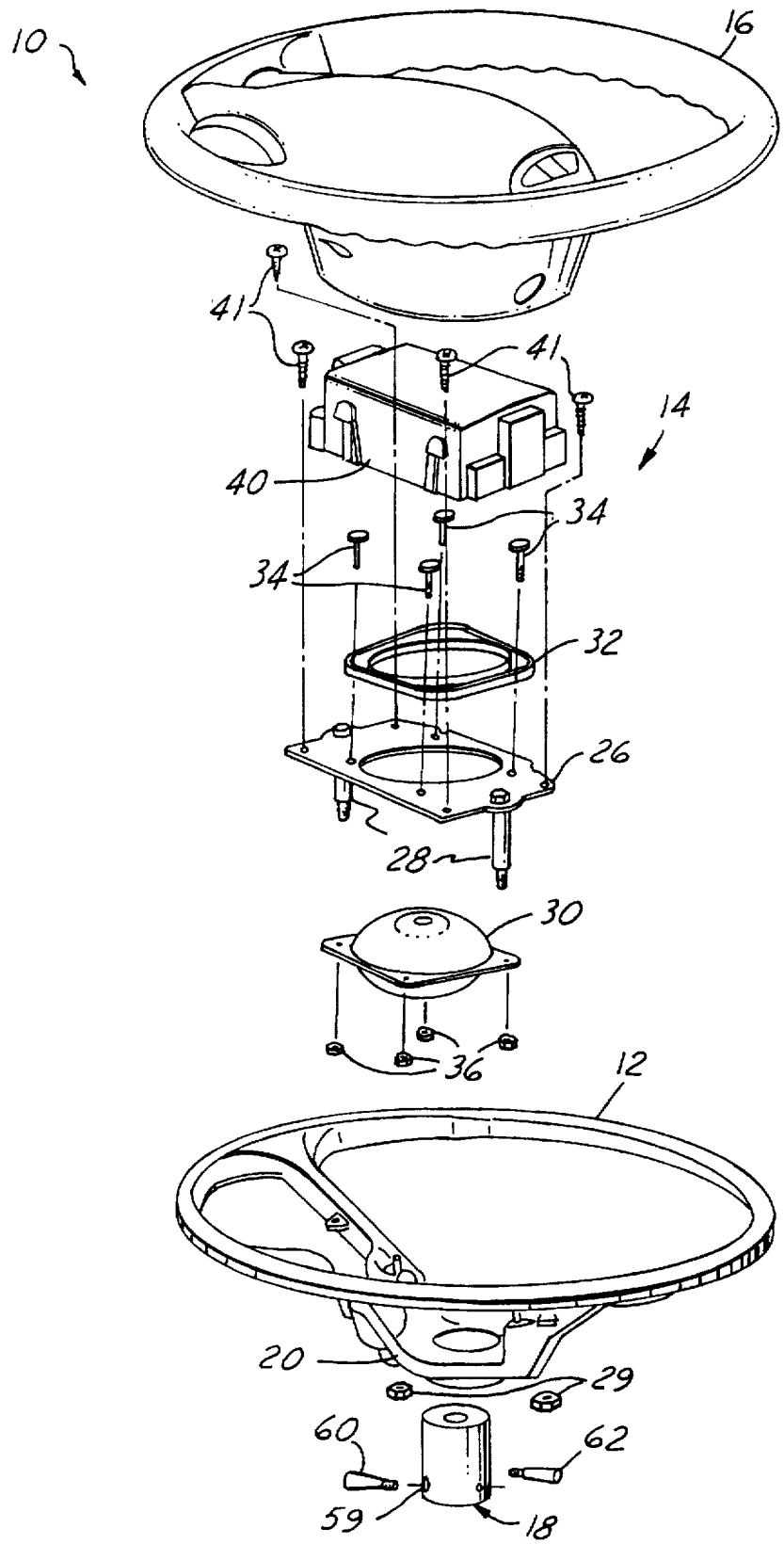

FIG. 3 is an exploded view of the integral steering wheel and air bag assembly.

Figure 4:
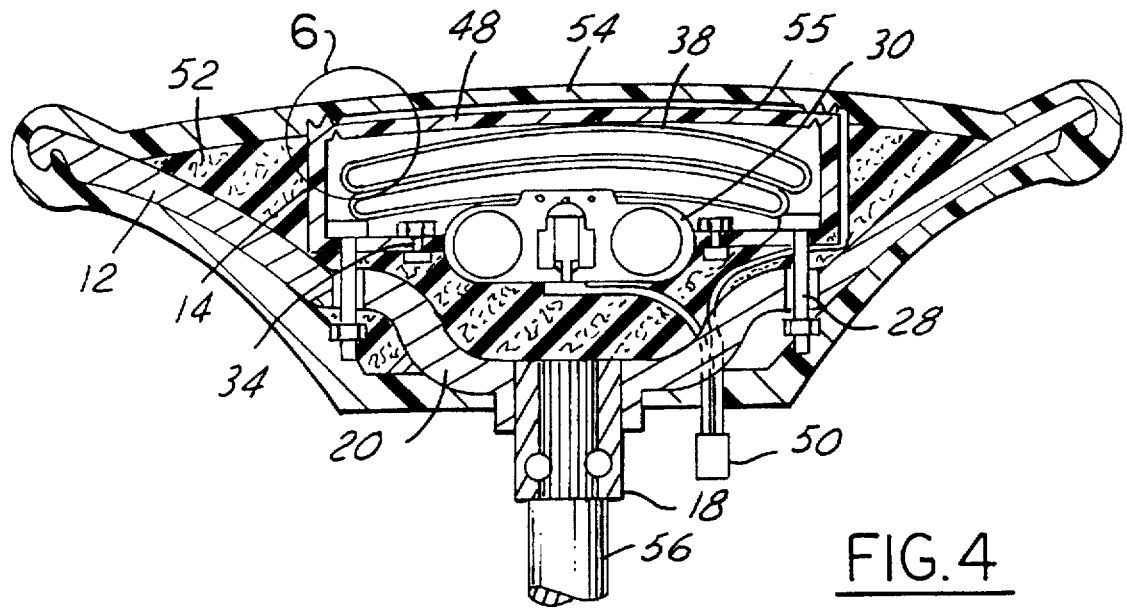

FIG. 4 is a sectional view of the integral steering wheel and air bag assembly taken from the bottom.

Figure 5:
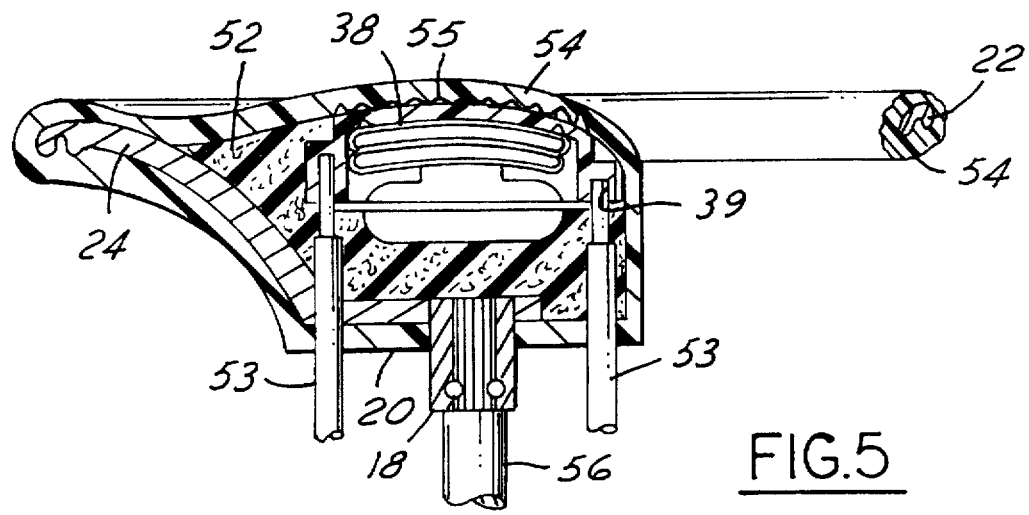

FIG. 5 is a sectional view of the integral steering wheel air bag assembly taken from the side.

Figure 6:
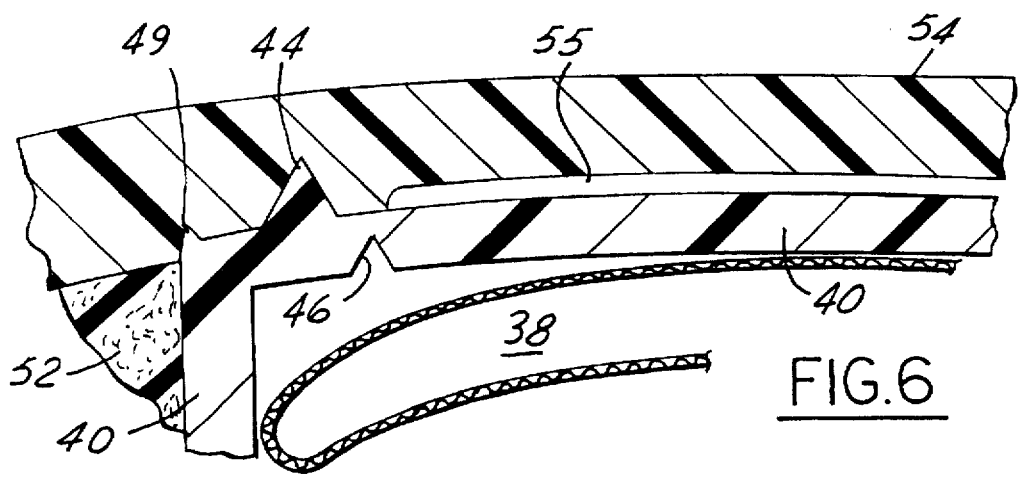

FIG. 6 is an enlarged sectional view of the integral steering wheel air bag assembly of the portion in circle 6 of FIG. 4.

Figure 7:
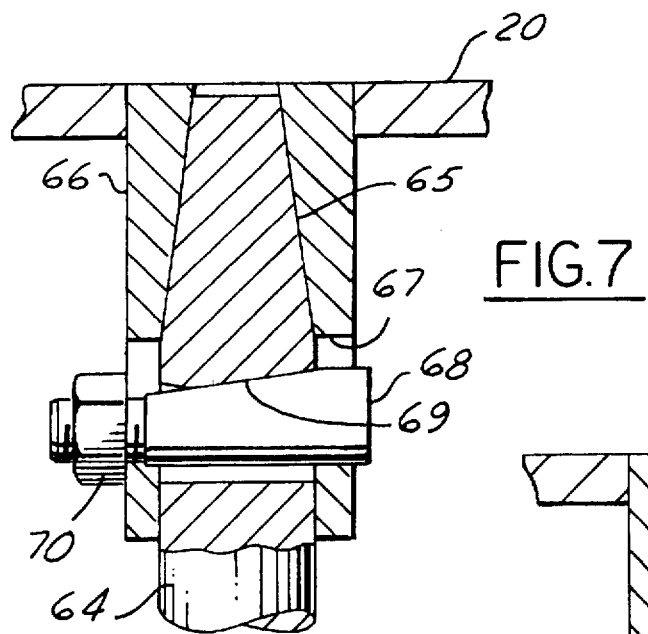

FIG. 7 is a first embodiment of a steering wheel to shaft attachment.

Figure 8:
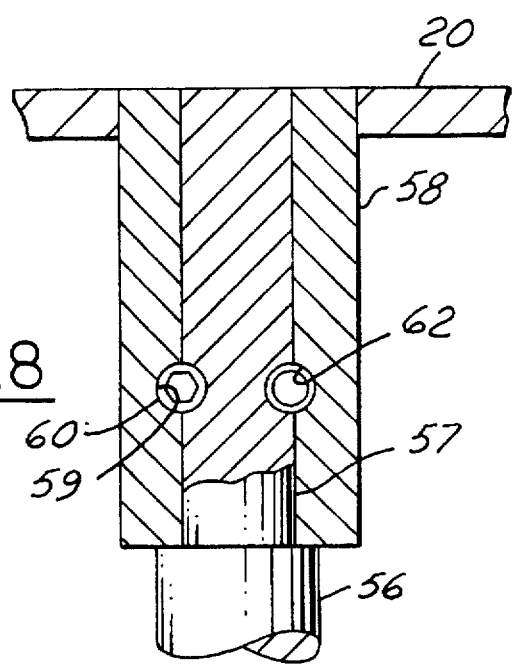

FIG. 8 is a second embodiment of a steering wheel to shaft attachment.

Figure 9:
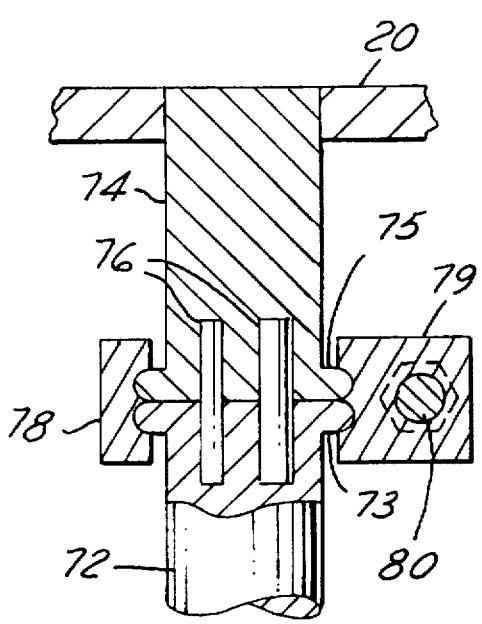

FIG. 9 is a third embodiment of a steering wheel to shaft attachment.

Figure 10:
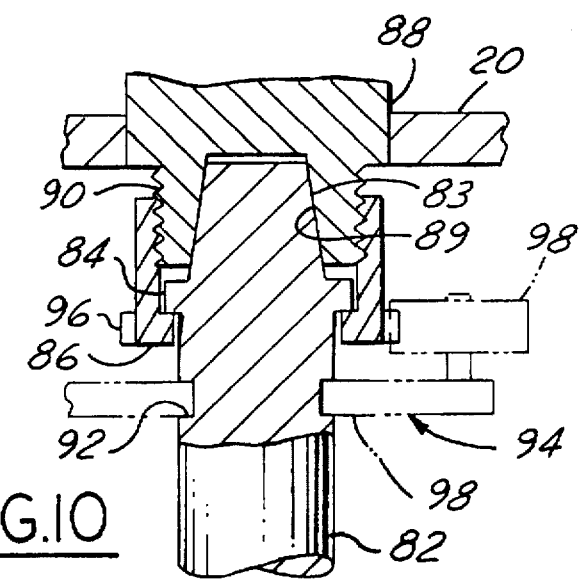

FIG. 10 is a fourth embodiment of a steering wheel to shaft attachment.

BRIEF DESCRIPTION OF A PREFERRED EMBODIMENT

Figure 1:
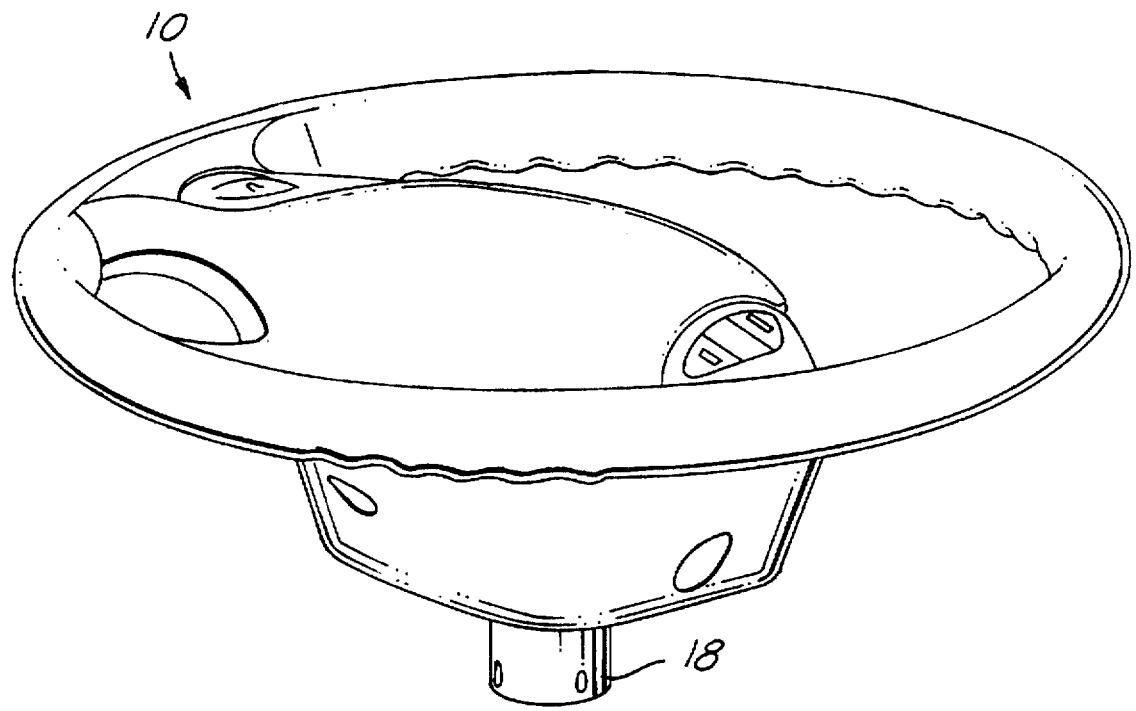
FIG. 1 is a perspective view of an integral steering wheel and air bag assembly according to this invention.

An integral steering wheel and air bag assembly 10 is shown in finished FIG. 1. A rigid skeleton 12, shown in FIG. 2 and made in one preferred embodiment of aluminum, provides a supporting structure of completed assembly 10. Of course, other materials, such as magnesium and steel may be employed for the skeleton.

An air bag module 14 is shown in FIG. 3 as part of assembly 10. An outer plastic covering 16 is molded over the skeleton 12 providing a surface presented to occupants of the vehicle. A column locking collar 18 is disposed on a back side of skeleton 12 for engaging a steering shaft. Several embodiments of collar 18 are shown in FIGS. 7–10.

Skeleton 12 is a unitary die casting including a hub 20, a rim 22 encircling hub 20 and three spokes 24 connecting hub 20 and rim 22. It should be appreciated, of course, that the skeleton 12 can have a different number of spokes, such as two or four, and can be a welded structure formed of several pieces.

Air bag module 14 includes a steel mounting plate 26 with a pair of shoulder studs 28 for attaching plate 26 to skeleton 12. A nut 29 is placed on each of studs 28 to retain it to skeleton 12. An inflator 30 is held against a lower side of plate 26 and encircled by a steel cushion ring 32 disposed on an upper side of plate 26. Four bolts or studs 34 and four nuts 36 clamp plate 26 between ring 32 and inflator 30. An air bag 38, or inflatable cushion shown in FIG. 4, and FIG. 5, is folded over and aligned with inflator 30 to receive gas therefrom when deployed. A plastic cover or housing 40, disposed over air bag 38 and inflator 30, is fixed to plate 26 by four self tapping screws 41 which thread into each corner of plate 26. Air bag module 14 is provided with a protective seal, such as a bead of silicone sealant around openings, or a shrink wrap film around the assembly to protect module 14 from plastic intrusion during the molding process.

Cover 40 has an outer tear seam 44 in the form of a sharp edge, best shown in FIG. 6, on an upper surface of cover 40. Outer seam 44 forms a U-shaped pattern open toward a top side of the steering wheel. An inner tear seam 46 is formed on an inner surface as a V-shaped groove, and is approximately aligned with outer seam 44. Inner tear seam 46 is configured to facilitate tearing of cover 40 along its length when air bag 38 is deployed. Inner tear seam 46 defines a door element 48 which swings or pivots open on the side having no tear seam. An outer bead 49 circumscribes an outer periphery of cover 40. An electrical connector 50 extends from inflator 30.

An inner plastic 52 surrounds module 14, fixing it to skeleton 12. Inner plastic 52 is formed in the following manner. Air bag module 14 is loosely attached to skeleton 12 by shoulder studs 28 and nuts 29 as shown in FIG. 4. Steering wheel skeleton 12 and air bag module 14 are placed in a first mold (not shown) having an upper surface, which together with skeleton 12 encloses air bag module 14. Four molding support pins 53 are inserted between spokes 24, through skeleton 12, and into receiving apertures 39 in cover 40. Pins 53 are biased upward until outer bead 49 engages the mold. A shot of plastic is injected into the first mold, forming the inner plastic. Outer bead 49 serves as a dam, preventing the first or inner shot from covering door element 48 of cover 40. The inner plastic 52 is preferably a foam type of plastic which is relatively light in weight and inexpensive.

An outer plastic 54 or plastic coating encloses the entire steering wheel skeleton 12 and the air bag module 14. A mylar and foil membrane switch 55 serving as the horn actuator switch is disposed between cover 40 and outer plastic 54. Membrane switch 55 has undulations which maximize the surface area in contact with outer plastic 54 to increase the strength of the adhesive bond between switch 55 and outer plastic 54. A portion of switch 55 wraps around an upper side of cover 40 to serve as a hinge for the portion of outer plastic 54 over door element 48 after deployment of air bag 38. Pins 53 are used to position the assembled skeleton 12 and air bag module 14 in a second mold (not shown). A second shot of plastic, preferably water blown polyurethane, a thermoset plastic, is injected into the second mold, forming outer plastic 54 which fully covers the skeleton and the air bag module, thereby providing a completely seamless modular steering wheel air bag assembly 10. Alternatively, other thermoset plastics, or thermoplastics such as vinyl may be used for the outer plastic. The material chosen must be able to skin the entire part and be wear resistant, have superior paint adhesion characteristics and have superior hot and cold temperature performance characteristics. An additional advantage of this method, beyond the seamless forming, is that the outer tear seam 44 defines a relatively thin section of outer plastic 54 which facilitates tearing of outer plastic 54 during air bag deployment, and also supports outer plastic 54. The support provided by outer tear seam 44 eliminates the "tear seam read through" effect in which an unsupported tear seam on an inner surface of an outer plastic cover is visible because of material sagging into the seam void.

Since the front side (the side facing the driver) of hub 20 is completely inaccessible once assembly 10 is completed, an alterative method of attaching assembly 10 to the steering column shaft was needed. The usual method is to place the steering wheel over a threaded end of the steering column shaft, and to run a nut down against the hub to fix the two together. Four alternative attachment embodiments are shown in FIGS. 7, 8, 9 and 10.

The embodiment shown in FIGS. 1–6 is shown in more detail in FIG. 8. Steering column shaft 56 has a reduced diameter portion 57 defining a shoulder. A locking sleeve 58, fixed to hub 20, is slidably disposed over the reduced diameter portion 57 and butts up against the shoulder. A spline (not shown) or other feature is used to orient the integral steering wheel air bag assembly 10 on the steering column shaft 56. When properly aligned, reduced diameter portion 57 and sleeve 58 define a pair of pin apertures 59.

Both of apertures 59 have threaded ends, and at least one of the apertures is tapered to receiving a first pin 60 which has a corresponding taper and a threaded end. As first pin 60 is tightened in aperture 59, the taper eliminates any lash between sleeve 58 and shaft 56. The second pin 62 and its corresponding aperture may either be tapered or of a constant diameter. The two pins 60 and 62 together keep shaft 56 and sleeve 58 rotatively locked. Pins 60 and 62 also ensure correct steering wheel to steering shaft alignment. An additional benefit of this configuration is that as long as the steering column lock remains intact, only one of pins 60 and 62 can be removed without having the ignition keys, making it impossible to access and remove more than one of pins 60 and 62, and therefore impossible to steal the steering wheel and air bag assembly 10.

In a first alternative embodiment shown in FIG. 7, a steering column shaft 64 is provided with a frustoconically tapered end 65. Steering column shaft 64 is received by a locking sleeve 66 fixed to hub 20. A wedge pin 68 passes transversely through aligned apertures 67 and 69 in both sleeve 66 and shaft 64 respectively. A tapered side of pin 68 engages a similarly tapered side of the aperture in shaft 64, while a flat oppositely disposed side of pin 68 engages sleeve 66, forcing shaft 64 deeper into sleeve 66. A retaining nut 70 on an end of wedge pin 68 draws pin 68 into aperture 69 and retains it there.

In a second alternative embodiment shown in FIG. 9, a steering column shaft 72 has a first annular lip 73 at an end thereof. A steering wheel stub shaft 74 is fixed to hub 20 and extends therefrom. A second annular lip 75 surrounds an end of stub shaft 74 distal to hub 20. A pair of alignment pins 76, one larger than the other, are placed in an end of one of the steering column shaft 72 and the stub shaft. The shafts 72 and 74 are then aligned so that the pins can pass into aligned the apertures in facing shaft, enabling the shafts to be butted up against each other in the desired alignment. A locking collar 78 is slipped over the annular lips. An open end 79 of the collar is drawn shut, or nearly shut, by tightening a clamping fastener 80, fixing the steering wheel and air bag assembly 10 to the steering column shaft 72.

In a third alternative embodiment shown in FIG. 10, a steering column shaft 82 with a frustoconically tapered end 83 has an annular lip 84 formed thereon proximate to a larger diameter portion of end 83. A threaded locking collar 86 is retained on the shaft 82 by lip 84. A locking sleeve 88 fixed to hub 20 has a tapered aperture 89 complementary to end 83. A threaded portion 90 of sleeve 88 is engaged by locking collar 86. As locking collar 86 is tightened on sleeve 88, the tapered end 83 of shaft 82 is drawn up into aperture 89. An engagement slot 92 in shaft 82 is for use with a special drive tool 94, shown in phantom. Drive teeth 96 on collar 86 are engaged by a drive gear 98 mounted to drive tool 94. Drive gear 98 is selectively rotated by an electric motor (not shown) drivingly connected thereto. Drive tool 94 has a collar portion 98 selectively disposed in slot 92 which reacts against any thrust generated against tool 94 by the tightening of collar 88.

The invention operates in the following manner. In an impact situation, a signal from a controller responsive to predetermined rates of acceleration actuates inflator 30. Gas from inflator 30 rushes into air bag 38, causing it to expand against cover 40. When air bag 38 develops a sufficiently large pressure against cover 40, cover 40 splits along inner tear seam 46 where cover 49 is thinnest. As seam 46 splits, the door 48 begins to open, the portion of outer plastic 54 splits along outer tear seam 44. Door 48 and the portion of outer plastic 54 disposed thereover rapidly swing open, with the portion of outer plastic 54 being retained by switch 55, and door 48 remaining connected at its hinge side.

While specific embodiments have been disclosed, it should be appreciated that many of the specific features described are merely exemplary, and that the true scope of the invention is as described below in the claims. For example, cover 40 may have its tear seams configured to provide two half doors, instead of one large door through which air bag 38 can escape. The precise method of fixing the steering wheel assembly to the steering column shaft may be changed.

We claim:

1. A steering wheel and air bag assembly comprising:

a rigid skeleton including a central hub, a rim encircling the hub and a plurality of spokes disposed therebetween;

an air bag module mounted to the skeleton;

a quantity of filler plastic at least partially filling a space between the air bag module and the skeleton and surrounding the air bag module wherein the filler plastic fixes the air bag module relative to the skeleton; and a continuous plastic coating distinct from the filler plastic disposed over at least a side of the skeleton hub facing a vehicle operator and the air bag module presenting a continuous surface to the vehicle operator when the steering wheel is mounted in a vehicle.

2. A steering wheel and air bag assembly comprising:

a rigid skeleton including a central hub, a rim encircling the hub and a plurality of spokes disposed therebetween;

an air bag module mounted to the skeleton and the air bag module including a cover and an air bag over which the cover is disposed and the cover having an inner tear seam across an upper portion of the cover to define a door therein through which a deployed air bag passes and the cover further having an outer tear seam in the form of a sharp edge essentially aligned with the inner tear seam and projecting from the cover in a direction opposite the air bag; and a continuous plastic coating disposed over at least a side of the skeleton hub facing a vehicle operator and the air bag module and the coating in engagement with the outer tear seam and the coating presenting a continuous surface to the vehicle operator when the steering wheel is mounted in a vehicle.

3. A steering wheel and air bag assembly as claimed in claim 2 wherein a membrane type horn switch is disposed over the cover and the switch wraps over a side of the cover and the plastic coating is bonded thereto, the membrane switch serving to retain a portion of the plastic coating after deployment of the air bag.

4. A method of forming an integral steering wheel and air bag assembly comprising the steps of:

forming a rigid skeleton having a central hub, a rim encircling the hub and a plurality of spokes disposed therebetween;

positioning an air bag module on the skeleton to a predetermined location thereon;

injection molding a first plastic completely covering the air bag module on a side of the air bag module opposite the skeleton; and injection molding a second plastic between the air bag module and the skeleton before molding the first plastic at least partially filling a space between the air bag module and the skeleton with the second plastic, wherein the second plastic retains the air bag module in a desired fixed position relative to the skeleton.

5. A method of forming an integral steering wheel and air bag assembly as claimed in claim 4 further including the steps of passing a plurality of molding support pins through the skeleton and into receiving apertures in a cover of the air bag module and biasing the air bag module away from the skeleton and into contact with a first mold before injection molding the second plastic.

6. A method of forming an integral steering wheel and air bag assembly as claimed in claim 5 further including the step of positioning the relatively fixed skeleton and air bag module in a desired predetermined position with the molding support pins in a second mold after molding the second plastic and before molding the first plastic.

7. A method of forming an integral steering wheel and air bag as claimed in claim 5 further including the steps of providing a peripheral bead circumscribing an upper surface of an air bag module housing which engages the first mold when the air bag module is biased away from the skeleton, wherein the peripheral bead acts as a dam to block flow of the second plastic from reaching an upper surface of the housing.

* * * * *